US010970068B2

(12) United States Patent
Shwartz et al.

(10) Patent No.: US 10,970,068 B2
(45) Date of Patent: Apr. 6, 2021

(54) COMPUTER STRUCTURES FOR COMPUTER ARTIFACTS

(71) Applicant: INTERNATIONAL BUSINESS MACHINES CORPORATION, Armonk, NY (US)

(72) Inventors: Larisa Shwartz, Greenwich, CT (US); John Davis, Winchester (GB); Victoria Lee Guerra, Yorktown Heights, NY (US); Amitkumar Paradkar, Mohegan Lake, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 16/354,761

(22) Filed: Mar. 15, 2019

(65) Prior Publication Data

US 2020/0293312 A1 Sep. 17, 2020

(51) Int. Cl.
*G06F 8/77* (2018.01)
*G06F 8/73* (2018.01)

(52) U.S. Cl.
CPC . *G06F 8/77* (2013.01); *G06F 8/73* (2013.01)

(58) Field of Classification Search
CPC ... G06F 16/93; G06F 8/77; G06F 8/73; G06F 16/24578; G06F 40/30
See application file for complete search history.

(56) References Cited

U.S. PATENT DOCUMENTS

| 10,248,626 B1* | 4/2019 | Zhang | G06F 16/313 |
|---|---|---|---|
| 2014/0201203 A1 | 7/2014 | Krishna | |
| 2018/0060503 A1* | 3/2018 | Allen | G16H 50/20 |
| 2018/0173699 A1* | 6/2018 | Tacchi | G06F 16/9024 |
| 2018/0190365 A1* | 7/2018 | Luck | G11C 29/38 |

(Continued)

OTHER PUBLICATIONS

Daichi Hanagaki et al.; Similarity-based Image Retrieval considering Artifacts by Self-Organizing Map with Refractoriness; IEEE; pp. 1095-1100; retrieved on Nov. 12, 2020 (Year: 2009).*

(Continued)

*Primary Examiner* — S. Sough
*Assistant Examiner* — Cuong V Luu
(74) *Attorney, Agent, or Firm* — Cantor Colburn LLP; Abdy Raissinia

(57) ABSTRACT

A technique relates to computer artifacts in a computer system. The technique includes creating a list of insights from artifacts, determining a similarity level between the insights of the artifacts and a predefined area of capability, comparing similarity level of insights for each of the artifacts to a threshold metric, removing artifacts having the similarity level below threshold metric such that artifacts remaining meet the threshold metric, and performing a pair-wise similarity comparison on the artifacts remaining which compares insights of the artifacts to each other to determine which ones are least common. The technique includes creating feature vectors for artifacts that are least common, determining a feature vector having a most variation in feature vectors, an artifact associated with the feature vector being determined to comprise a unique insight, and generating a unique message using the artifact associated with the feature vector being the unique insight.

20 Claims, 6 Drawing Sheets

(56) References Cited

U.S. PATENT DOCUMENTS

2018/0246974 A1    8/2018   Shukla et al.
2019/0220695 A1*   7/2019   Nefedov ................ G06F 16/38

OTHER PUBLICATIONS

Takahiro Yamane et al.; Similarity-based Image Retrieval considering Size and Color of Artifacts by Self-Organizing Map with Refractoriness; IEEE; pp. 1150-1156; retrieved on Nov. 12, 2020 (Year: 2013).*

* cited by examiner

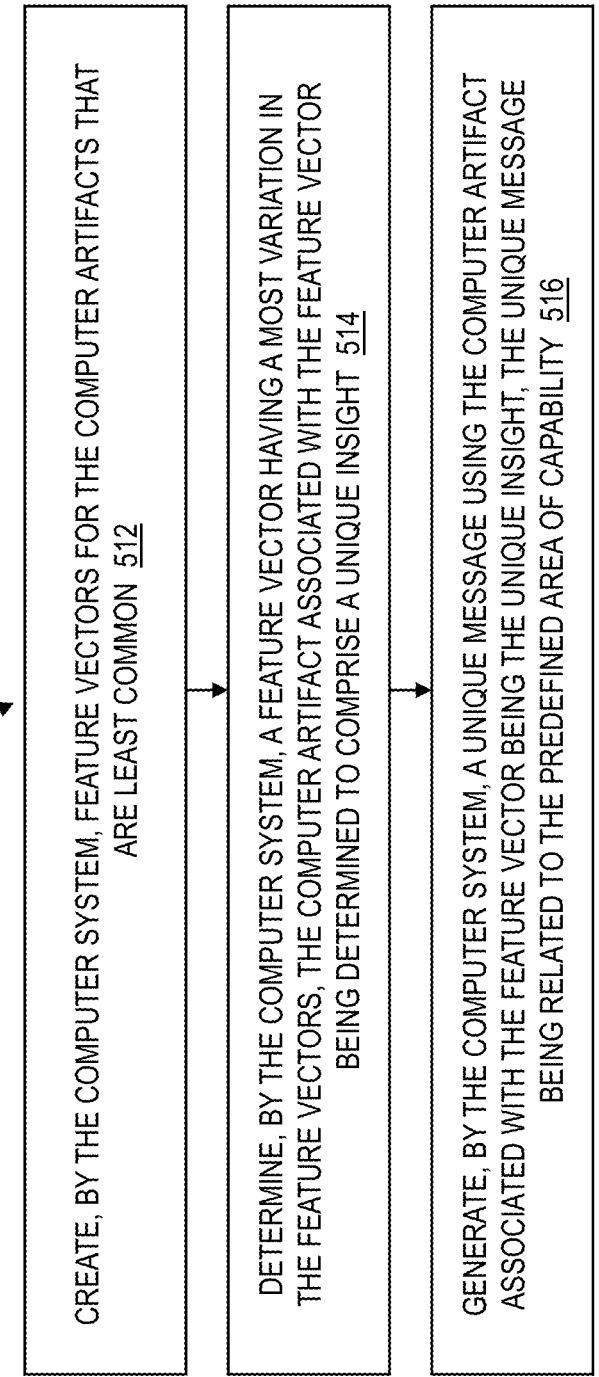

COMPUTER STRUCTURES FOR COMPUTER ARTIFACTS

BACKGROUND

The present invention generally relates to computing systems, and more specifically, to computer systems, computer-implemented methods, and computer program products for computer structures for computer artifacts.

An artifact is one of many kinds of tangible by-products produced during the development and/or use of software. Some artifacts (e.g., use cases, class diagrams, and other Unified Modeling Language (UML) models, requirements and design documents) help describe the function, architecture, and design of software. In computer science, a data structure is a data organization, management and storage format in memory which enables efficient access and modification. Particularly, a data structure is a collection of data values, the relationships among them, and the functions or operations that can be applied to the data.

SUMMARY

Embodiments of the invention are directed to a computer-implemented method for computer artifacts in a computer system. A non-limiting example of the method includes creating, by the computer system, a list of insights from computer artifacts, determining, by the computer system, a (semantic or otherwise) similarity level between the insights of the computer artifacts and a predefined area of capability, comparing, by the computer system, the similarity level of the insights for each of the computer artifacts to a similarity threshold metric, and removing, by the computer system, the computer artifacts that have the similarity level below the similarity threshold metric such that the computer artifacts remaining meet the similarity threshold metric. Also, the method includes performing, by the computer system, a pair-wise similarity comparison on the computer artifacts remaining which compares the insights of the computer artifacts to each other to determine which ones of the computer artifacts are least common, and creating, by the computer system, feature vectors for the computer artifacts that are least common. Further, the method includes determining, by the computer system, a feature vector having a most variation in the feature vectors, a computer artifact associated with the feature vector being determined to comprise a unique insight, and generating, by the computer system, a unique message using the computer artifact associated with the feature vector being the unique insight, the unique message being related to the predefined area of capability.

Embodiments of the invention are directed to a system for computer artifacts. A non-limiting example of the system includes a processor, and memory coupled to the processor and comprising computer-executable instructions that, when executed by the processor, cause the processor to perform a method. The method includes creating, by the processor, a list of insights from computer artifacts, determining, by the processor, a similarity level between the insights of the computer artifacts and a predefined area of capability, comparing, by the processor, the similarity level of the insights for each of the computer artifacts to a similarity threshold metric, and removing, by the processor, the computer artifacts that have the similarity level below the similarity threshold metric such that the computer artifacts remaining meet the similarity threshold metric. Also, the method includes performing, by the processor, a pair-wise similarity comparison on the computer artifacts remaining which compares the insights of the computer artifacts to each other to determine which ones of the computer artifacts are least common, and creating, by the processor, feature vectors for the computer artifacts that are least common. Further, the method includes determining, by the processor, a feature vector having a most variation in the feature vectors, a computer artifact associated with the feature vector being determined to comprise a unique insight, and generating, by the processor, a unique message using the computer artifact associated with the feature vector being the unique insight, the unique message being related to the predefined area of capability.

Embodiments of the invention are directed to a computer program product for computer artifacts. The computer program product comprising a computer readable storage medium having program instructions embodied therewith, where the computer readable storage medium is not a transitory signal per se, the program instructions executable by a computer system to cause the computer system to perform a method. A non-limiting example of the method includes creating, by the computer system, a list of insights from computer artifacts, determining, by the computer system, a similarity level between the insights of the computer artifacts and a predefined area of capability, comparing, by the computer system, the similarity level of the insights for each of the computer artifacts to a similarity threshold metric, and removing, by the computer system, the computer artifacts that have the similarity level below the similarity threshold metric such that the computer artifacts remaining meet the similarity threshold metric. Also, the method includes performing, by the computer system, a pair-wise similarity comparison on the computer artifacts remaining which compares the insights of the computer artifacts to each other to determine which ones of the computer artifacts are least common, and creating, by the computer system, feature vectors for the computer artifacts that are least common. Further, the method includes determining, by the computer system, a feature vector having a most variation in the feature vectors, a computer artifact associated with the feature vector being determined to comprise a unique insight, and generating, by the computer system, a unique message using the computer artifact associated with the feature vector being the unique insight, the unique message being related to the predefined area of capability.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5B depicts a continuation of the flowchart in FIG. 5A according to embodiments of the invention.

Figure 1:
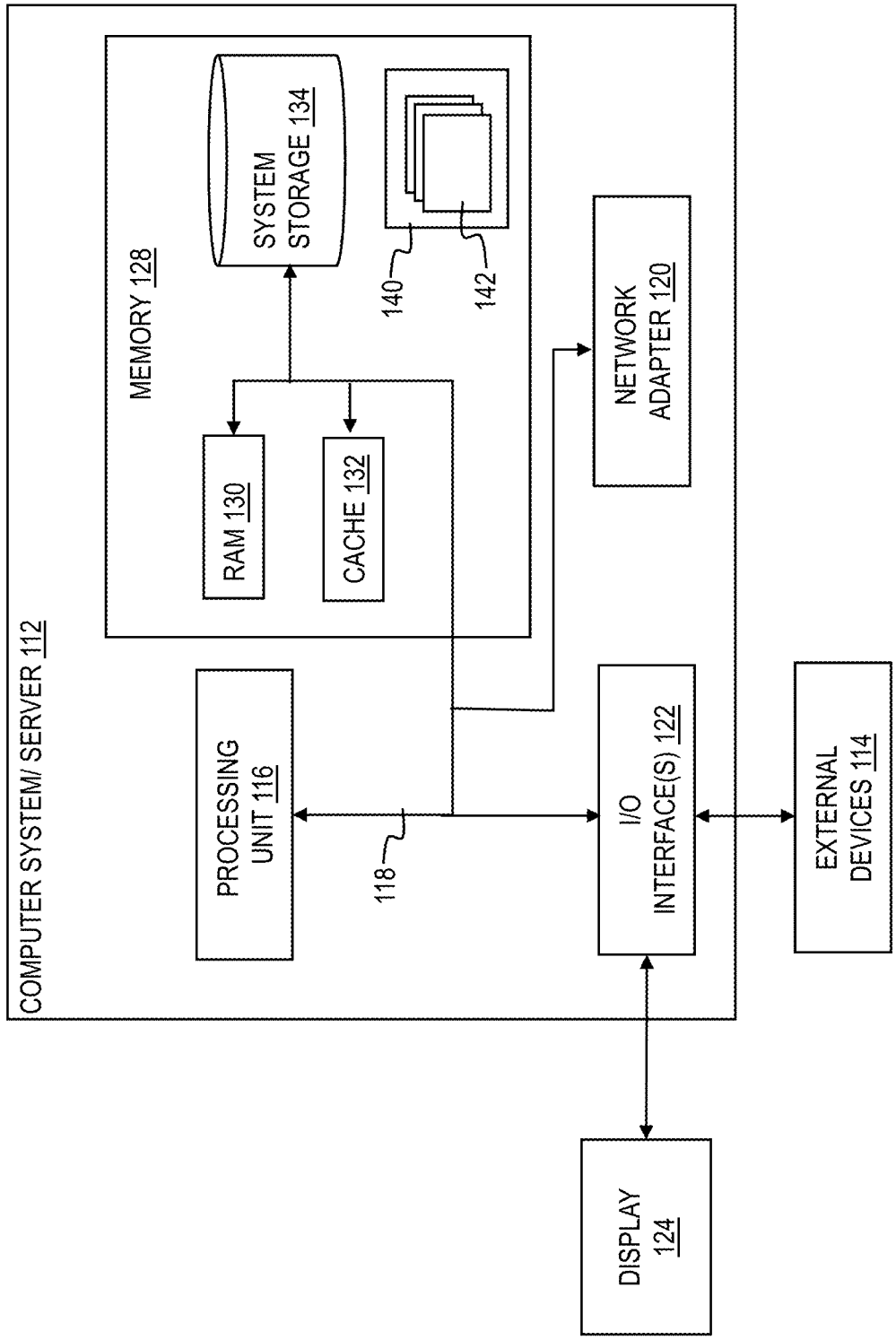
FIG. 1 depicts a schematic of an example computing system according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Turning now to an overview of technologies that are more specifically relevant to aspects of the invention, there are many computer artifacts on a computer system. It can be difficult to determine those computer artifacts that are different and attempting to determine such differences can use lots of computer processing power (e.g., a high percentage of the utilization of the processor(s)). While uniqueness might not be a critical factor for a certain enterprises (such as a business), uniqueness and/or determining uniqueness can be important in computer systems, computer databases, virus scanning, malicious computer scripts, advertising, etc. Computer systems in, for example, a data center can have an enormous amount of data in which uniqueness can be required among computer artifacts.

Turning now to an overview of the aspects of the invention, one or more embodiments of the invention are configured to generate a particular unique message, (along with an image), based on a discovered unique insight using a computer database of a computer system. This can be accomplished by identifying computer artifacts with unique insights based on the overall performance of a whole group of artifacts from similar solutions. There can be a variety of uses for determining unique computer artifacts in data of a computer system, for example, in a data center.

For example, industry/service providers can benefit from determining unique computer artifacts. Increasingly complex Information technology (IT) environments call for creation of new computer services. Services are produced by both well-established software producers as well as by start-ups. Every update and new version of software executing on a computer system often contains new functionality. Service providers are interested in covering all space fully, including unique capabilities as a differentiator. With agile approaches, new versions/updates are being created in an expedited rate. Technical assessment of new and updated services becomes an on-going full-time job. However, embodiments of the invention are configured to provide an automated technical assessment of a group of documents, artifacts, etc., (release notes) that points to a service/update with unique insights in comparison to others in the same group (which might also point to errors). Additionally, computer service providers are interested in advertising unique capabilities as their differentiators. Often the new services seem to be the same as they described at the high level, while low level descriptions often are overlooked (or misunderstood) by marketing professionals which often leads to advertisements not being on the mark (or even over-promising in order to differentiate) instead of exposing existing unique capabilities. According to one or more embodiments of the invention, a computer system is configured to generate a message (e.g., an advertisement message, an executable message correcting an error, etc.), and potentially image, based on discovered unique insight descriptions/comments (natural language artifacts) on a service, capability, and/or component which has been collected, processed, and/or assessed based on the overall performance of a whole group of artifacts from similar solutions. Additionally, embodiments of the invention can identify artifacts with unique insights about the capability, and subsequently, extract these unique insights with their sub-topics.

When evaluating an artifact, there is a high volume of existing content that needs to be assessed in order to produce an accurate and effective evaluation of its quality and the uniqueness it delivers. There has to be an understanding of the uniqueness because unique features and unique insights have value. Embodiments of the invention provide an automated method to electronically read and acquire insights and summaries from artifacts, like essays, product specifications, computer scripts, etc., without having to create a list of words and topics manually.

Turning now to a more detailed description of aspects of the present invention, FIG. 1 depicts a schematic of an example computing system 112 according to embodiments of the present invention. The computer system/server 112 can be operational with numerous other general purpose or special purpose computing system environments or configurations. The computer system/server 112 can be representative of various types of computer systems on which communication functions can run in a computer network 300. The functions and capabilities of computing system 112 can be utilized in FIGS. 1, 2, 3, 4, 5A, and 5B to implement features discussed herein (including devices 302A-302N), according to embodiments of the invention.

Examples of well-known computing systems, environments, and/or configurations that can be representative of and/or include elements of computer system/server 112 include, but are not limited to, personal computer systems, phones (e.g., cellphones, smart phones, etc.), server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

The components of computer system/server 112 may include, but are not limited to, one or more processors or processing units 116, a system memory 128, and a bus 118 that couples various system components including system memory 128 to processor 116. Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media. The system memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include but are not limited to: microcode, device drivers, redundant processing units, external disk drive arrays, RAID systems, tape drives, and data archival storage systems, etc.

Figure 2:
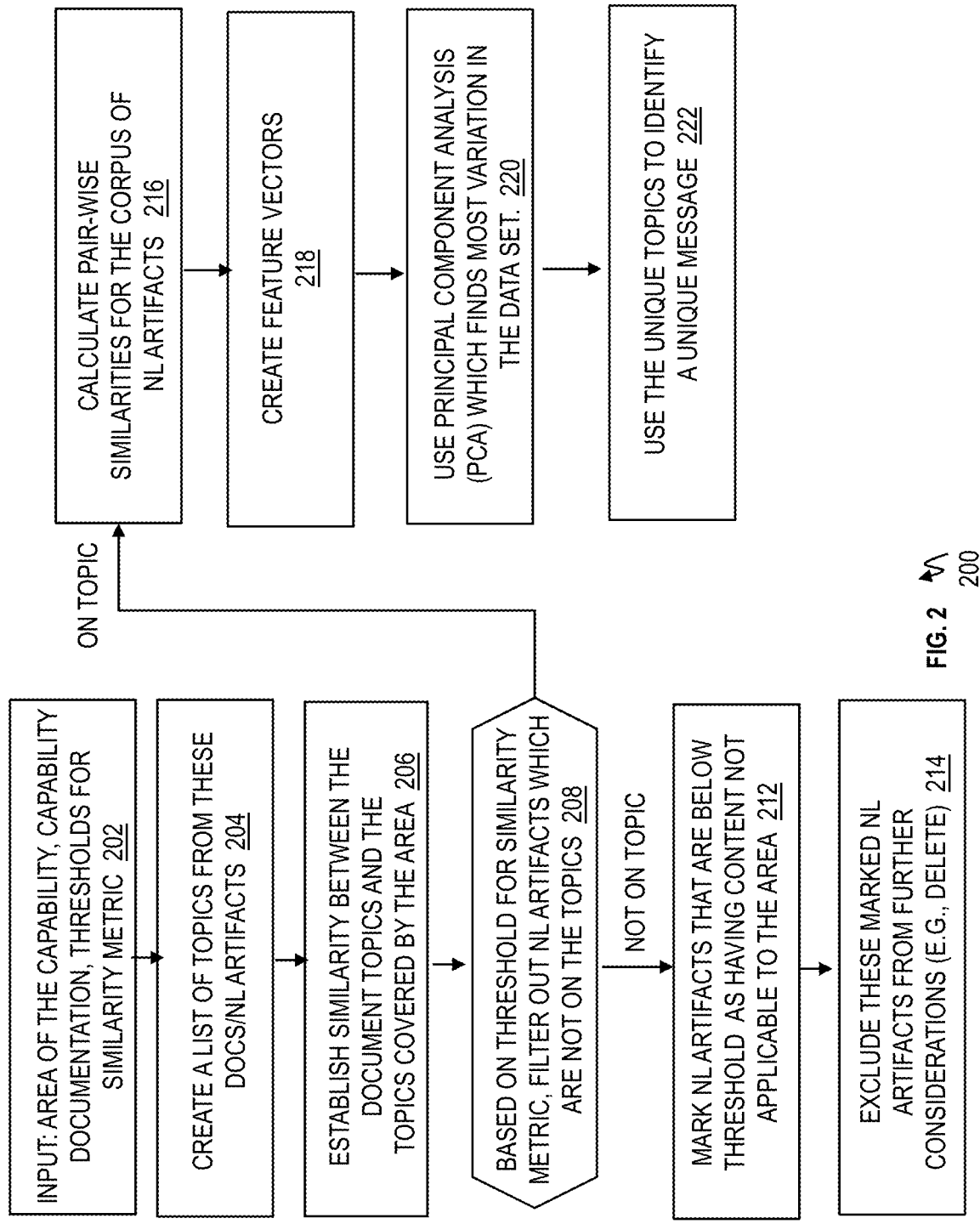
FIG. 2 depicts a flowchart of processing various computer artifacts in the computer system according to embodiments of the invention.
Figure 3:
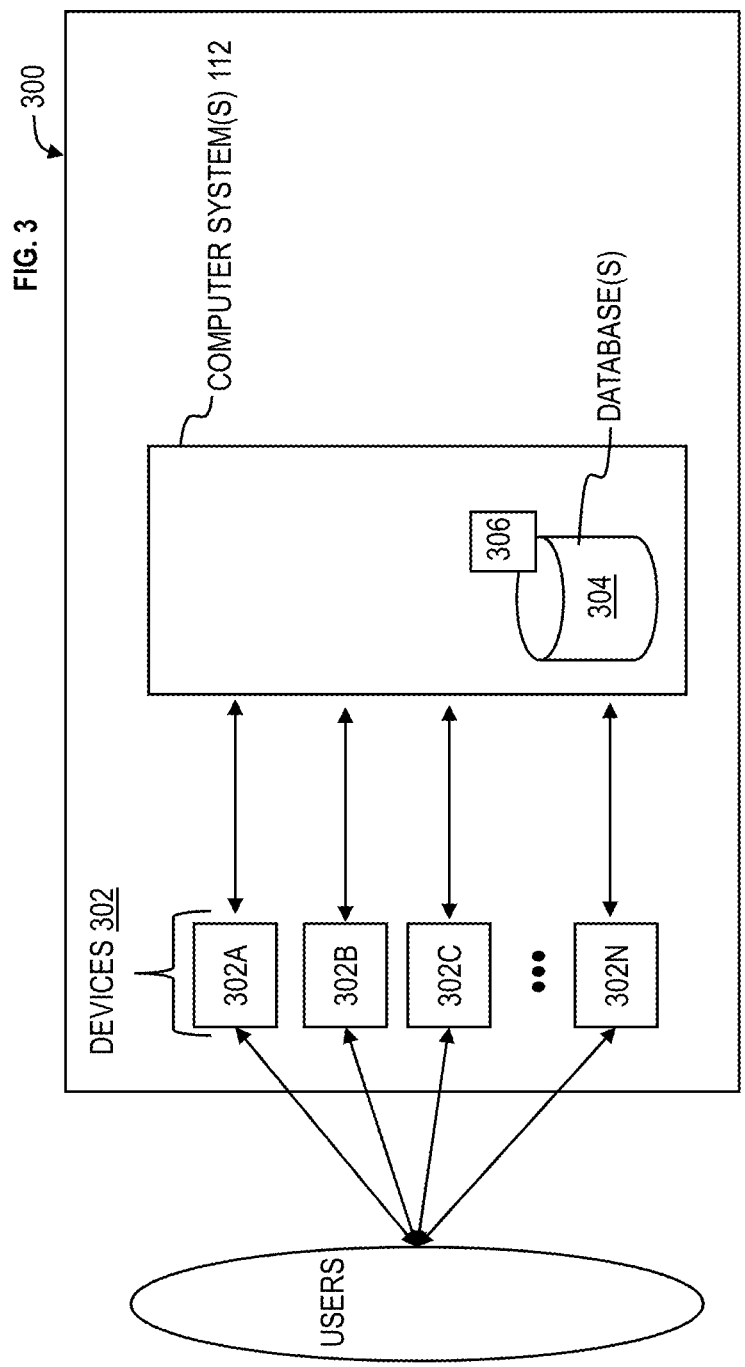
FIG. 3 depicts a computer network including multiple computer systems coupled together according to embodiments of the invention.

FIG. 2 depicts a flowchart 200 of processing various computer artifacts/documents in the computer system 112 according to embodiments of the invention. One or more program modules 142, having computer-executable instructions, are configured to execute operations of the flowchart 200 in FIG. 2. FIG. 3 depicts a computer network 300 including multiple computer systems coupled together according to embodiments of the invention. In FIG. 3, the computer system 112 can be operatively coupled to one or more devices 302A-302N (generally referred to as devices 302). The devices 302 can be contained in the same computer network 300 (or datacenter) as the computer system 112 and/or one or more of the devices 302 can be in separate computer networks from the computer system 112. The devices 302 can include one or more capabilities of the computer system 112. The devices 302 can be representative of various servers, such as social media servers, computer ordering (online/Internet) servers, etc., which provide computer services to end users, and where data associated with the end users (via their respective end-user devices). For example, the devices 302 can include blog data, survey data, commenting and opinion data, etc., which can related to foods, restaurants, products, technology, entertainment, etc.

Referring to FIGS. 1, 2 and 3 at block 202, the program module(s) 142 is configured to extract and/or receive input data from the devices 302A-302N for storage in one or more databases 304 in the computer system 112. The input data from the devices 302A-302N is referred to as the capability documentation, in which various documents (computer artifacts) are received as part of the data from devices 302A-302N. The documents (computer artifacts) can be files, data structures, computer scripts, etc., in natural language. Also, the computer artifacts can be stored in across one or more databases such as the database(s) 304 depicted in FIG. 3. The program module(s) 142 (e.g., software application) is configured to receive input of area of capability and input of the threshold for similarity metric to be used in later processing. The area of capability can be defined as a topic (e.g., main topic predefined in advance), and it will be determined that the unique computer artifact has a unique relationship to the predefined main topic. The threshold for similarity metric can be a threshold confidence level that the computer artifacts (documents) are going to be similar to the predefined main topic. The threshold for similarity metric can be a probability of about a 60% or 70% confidence level that the computer artifacts (documents) are similar to the predefined main topic. The threshold for similarity metric can be defined in a variety of ways, for example, by using regression analysis.

In some embodiments of the invention, some of the devices 302A-302N might not be present and the users (operating user devices, such as cellphones, smartphones, computers, laptops, tablets, gaming systems, etc.) can interact directly with the computer system 112. The computer system 112 is configured to store an enormous amount of data related to, for example, social media, computer scripts/programs, etc. For example, the computer system 112 can encompass one or more servers coupled together and operating in parallel or operating as an integrated computer system.

Figure 4:
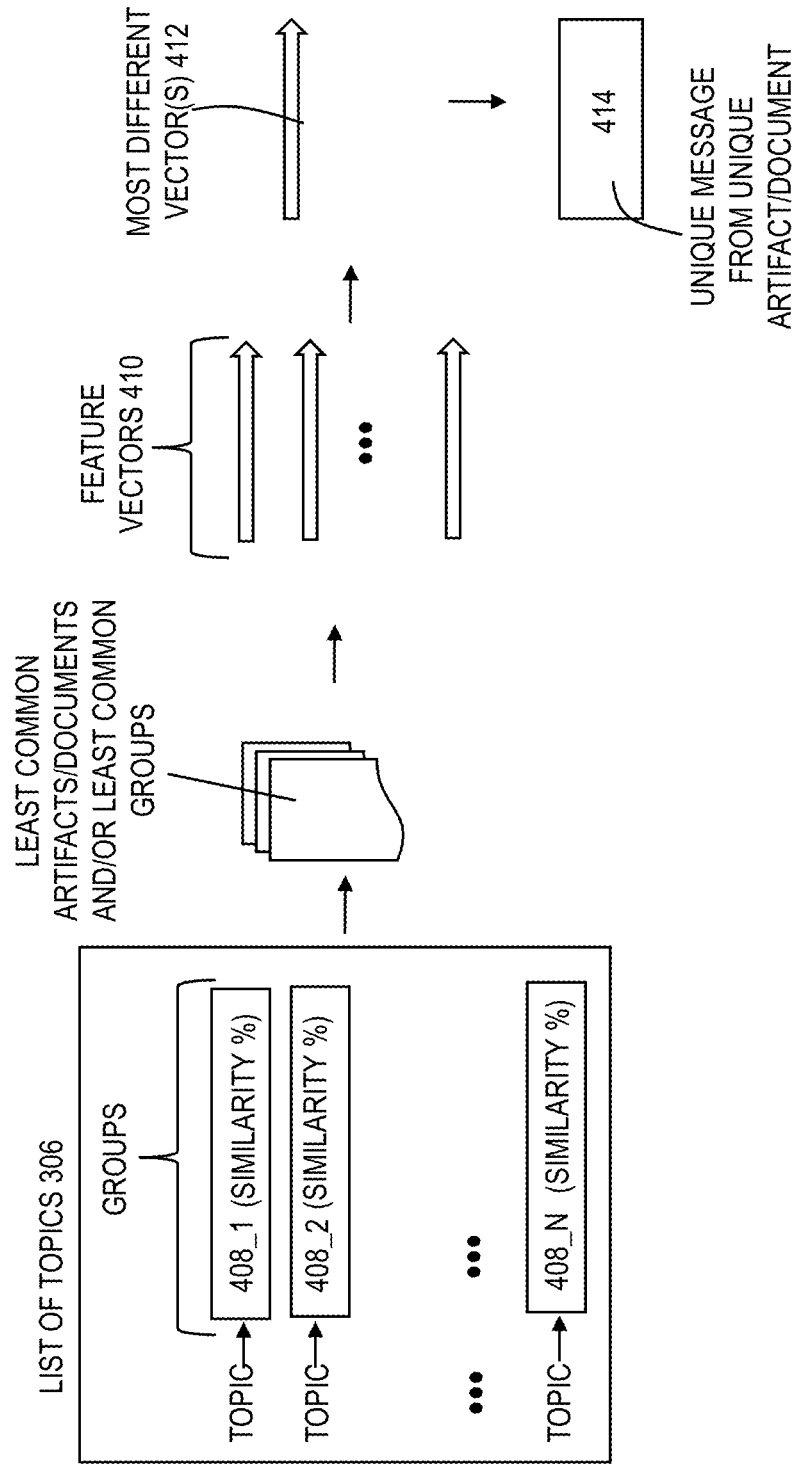
FIG. 4 depicts an example of the computer system processing the computer artifacts according to embodiments of the invention.

At block 204, the program module(s) 142 is configured to identify topics from the computer artifacts (documents) and create a list of topics 306 from these computer artifacts (e.g., natural language (NL) document). The list of topics 306 can be stored in database 304. A topic is defined to be a probability distribution across words from a domain specific language (which could be represented as an ontology). Topic modeling is built on distributional hypothesis, suggesting that similar words occur in similar contexts. Given a set of documents/artifacts describing a solution, each consisting of a sequence of words, the program module 142 is configured to use a topic modeling algorithm to find useful sets of topics. Example topic modeling algorithms can include, for example, hierarchical Dirichlet processes (HDP), latent Dirichlet processes (LDP) in conjunction with a method to determine the number of topics, etc. When using LDP in conjunction with a method to determine the number of topics, one possible method to determine the optimal number of topics is to run experiments with a various number of topics and choose one topic that marks the end of a rapid growth of topic coherence. However, the HDP topic model infers the number of topics from the data and does utilize a separate method to determine the optimal number of topics. HDP can model topics across collections of documents, which share some common topics across different corpora but also may have some special topics within each corpus. A corpus is a collection of text and/or textual documents. The topics are flat clusterings, but the HDP model has another level for producing the number of topics. In statistics and machine learning, the hierarchical Dirichlet process (HDP) is a nonparametric Bayesian approach to clustering grouped data. It uses a Dirichlet process for each group of data, with the Dirichlet processes for all groups sharing a base distribution which is itself drawn from a Dirichlet process. This method allows groups to share statistical strength via sharing of clusters across groups. As a result, FIG. 4 depicts how the program module 142 is configured to create topic groups 408_1-408_N (generally referred to as groups 408) for the computer artifacts (documents), and each one of the artifacts is designated in one of the groups 408. Computer artifacts (documents) can be grouped together because they mention (i.e., contain) the same word (e.g., car) and/or a synonym of the same word. It is noted that machine learning includes supervised learning. Supervised learning is when the computer is presented with example inputs and their desired outputs, given by a "teacher," and the goal is to learn a general rule that maps inputs to outputs.

As an example scenario, the area of capability which is predefined in advance can be for a particular food product and/or a restaurant. Some of the devices 302 can be servers for a variety of social media such as, for example, an online news and social networking services on which users post and interact with messages, online social media and social networking services, online search services powered by crowd-sourced reviews about local businesses, etc. Accordingly, the artifacts (documents) can be related to food (e.g., the food product) and/or the restaurant. The topics of the artifacts (documents) can include the words in the respective artifacts (documents) themselves. For example, a document (artifact) can be a blog, tweet, comment, etc., related to the predefined area of capability which is the predefined main topic (e.g., the food product and/or restaurant). There can be some artifacts (documents) that contain one or more of the same words, and FIG. 4 illustrates how these artifacts (documents) can be grouped together in the same group (e.g., grouped in one of the groups 408_1-408_N). Additionally, the area of capability can be related to finding for executable computer scripts having executable code that might be erroneous, accidental, harmful, and/or malicious. Accordingly, the artifacts (documents) can be related to computer scripts in computer programs. The topics of the artifacts (documents) can include the words/text in the respective artifacts (documents) themselves (i.e., computer scripts) where these words relate to executables to be processed on the computer system 112.

At block 206, the program module 142 is configured to establish similarity between the artifacts/document topics of the computer artifacts/documents and the predefined main topic covered by the area of capability. Particularly, the program module 142 is configured to separately establish similarity between each respective group 408_1-408_N having a respective topic and the predefined main topic. The program module 142 is configured to perform feature extraction, which can first extract hidden topics and then encode documents/solution descriptions using topic level features. Again, the program module 142 may use hierarchical Dirichlet processes (HDP). Embodiments of the invention are configured to train HDP on a set of known and classified documents. For example, published patents/documents from the patent office for the subject of advertising can be utilized. Typically each patent document has a number of claims associated with the document. Claims are distinct by definition and represent a unique topic. In some implementations, there can be other (potentially manually) labeled data. Embodiments of the invention ensure that HDP only considers a context that is related to the predefined main topic, and this is done through introduction of a subject specific vocabulary for use by the HDP.

As a result of establishing similarity between the document topics for the groups 408 of the documents (artifacts) and the main topic covered by the area of capability (by performing a comparison between the respective topic of the group to the main topic of the area of capability to determine the percentages of matches), the program module 142 is configured to assign the confidence level as a percentage % of similarity for each of the topics and/or groups 408 (i.e., each group 408_1-408_N has its own topic in the list of topics 306). HDP is a typical probabilistic topic model that identifies the probability of the result of clustering being 'true' relative to what is expected. For example, the group of artifacts (documents) determined to be in topic group 408_1 is assigned a similarity percentage % based on its previous comparison, topic group 408_2 is assigned a similarity percentage % based on its previous comparison, and so forth through topic group 408_N which is assigned a similarity percentage % based on its previous comparison. Some of the similarity percentages % can be the same for some groups 408, and some groups will have different similarity percentages %. As one example, a particular group 408 can have a topic that includes all of the words in the predefined main topic (i.e., area of capability), and in this case, the particular group 408 would have a similarity percentage of 100%. In some cases, similarity percentage can be referred to as a similarity level.

At block 208, based on threshold for similarity metric (percentage), the program module 142 is configured to filter out the natural language (NL) artifacts (documents) which are not on topic. For example, the threshold for similarity metric might be 70%. Accordingly, any topic groups 408 that are determined to have a similarity percentage lower than the threshold for similarity metric (e.g., 70%) are filtered out, as not being on topic. Accordingly, taking the branch for not on topic proceeds to blocks 212 and 214, and the program module 142 is configured to mark these artifacts (documents) that are below the threshold for similarity metric (e.g., 70%) as having content not applicable to the area of capability (i.e., the predefined main topic). The program module 142 is configured to exclude these marked (NL) artifacts (documents) from further processing/consideration. The program module 142 is configured to delete the marked documents thereby improving the memory 128 and improving the processing by the processing unit 116 (e.g., processors). This improves the functioning of the computer itself because less memory 128 is required because the program module 142 has determined to delete the marked artifacts (documents) from memory 128, thereby no long filling memory space of the memory 128. Additionally, this requires less processing utilization by the processing unit 116 because the deleted artifacts (documents) do not require further processing via the processing unit 116. This also requires less usage of the cache 132 which would have been required to store operations related to the marked artifacts (documents) even though the marked artifacts are not needed. By marking and deleting the marked artifacts (documents), embodiments of the invention result in a faster speed for the computer system (faster speed for the processor and cache) and improved memory.

Taking the other branch for the artifacts (documents) that are on topic according to meeting and/or exceeding the threshold for similarity metric, the program module 142 is configured to perform further analysis on these documents (artifacts). At block 216, the program module 142 is configured to calculate pair-wise similarity for the corpus of (NL) artifacts (documents) which are on topic (i.e., meeting or exceeding threshold for similarity metric. The pair-wise similarity comparison compares the topic of each artifact (document) to the topic of another artifact (document) (until all artifacts/documents are compared to each) to determine which ones of the artifacts (documents) are least common. Also, the program module 142 is configured to perform pair-wise similarity comparison between one group 408 (e.g., one cluster) to another group 408 (e.g., another cluster), until all groups 408 are compared to determine which ones of the groups 408 (clusters) are least common. As the program module 142 encodes all documents as feature vectors, the program module 142 uses cosine similarity to measure their similarities (as distance between two vectors), as the measurement between each two documents, hence pair-wise comparison. The program module 142 is looking for any vector that is further from any other vector (while still on the topic). The program module 142 can determine that a particular subset of the artifacts (documents) represents the least common artifacts (documents) and/or determine that a particular subset of the groups 408 represents the least common groups. Pair-wise comparison is any process of comparing entities in pairs to judge which of each entity is preferred or has a greater amount of some quantitative property, or whether or not the two entities are identical.

At block 218, the program module 142 is configured to create feature vectors 410 for each of the artifacts (documents) from the particular subset of the artifacts (documents) representing the least common artifacts (documents) and/or create feature vectors for each of the particular subset of the groups 408 representing the least common groups 408. In machine learning and pattern recognition, a feature is an individual measurable property or characteristic of a phenomenon being observed. A feature vector is a vector that contains information describing an object's important characteristics (i.e., features). Accordingly, words of each artifact (document) are allocated to a specific location (or slot) in the feature vector, and the words might be assigned a value based on a Cartesian grid based on their differences. For example, the program module 142 encodes the words of an artifact (document) in a feature vector, such that all of the artifacts (documents) are encoded into their respective feature vectors 410. Feature vectors are not created for the marked artifacts that were deleted. Further, feature vectors 410 are created (only) for the least common artifacts and/or least common groups 408 determined in block 216.

At block 220, the program module 142 is configured to use pair-wise comparison of 'insight', for example, Principal Component Analysis (PCA) which finds the most variation among feature vectors 410 of the artifacts (documents) in the data set, which is identified as feature vector(s) 412. For example, the distance of the words in the feature vectors 410 furthest away from the x-axis and y-axis have the greatest variation. The (words of the) most different feature vector 412 represents a unique topic(s) (or unique insight) for the corresponding artifact (document) and/or represent a unique topic(s) (unique insight) for the corresponding group 408. Therefore, the program module 142 has found the unique artifact (document) from the input and/or found the unique topic group. The most unique topic can be for a single artifact, for example, there might be a topic group 408 that contains the single computer artifact. Also, the most unique topj: can be for more than one computer artifact, for example, the topic group 408 has more than one computer artifacts. When the most unique topic corresponds to more than one computer artifact, the combined text of the corresponding computer artifacts can be utilized as part of the unique message below.

At block 222, the program module 142 is configured to use the unique topics to identify a unique message for advertisement which can be translated to an image. The program module 142 can identify (and/or generate) a unique message 414 from the (words/text in the) unique artifact (document) and/or identify (and generate) a unique message 414 from the (combined) words/text in the unique topic group (one of the groups 408). The unique message 414 can be utilized for advertisement related to the main topic (which can be related to a product and/or service). Also, the program module 142 is configured to find an image related to the unique message 414. In some cases, the computer artifacts (documents) could be computer scripts (of an operating system, a software program, etc.) for a computer system, and the unique message 414 can correspond to a hidden error in the computer scripts. Accordingly, the area of capability would define erroneous computer scripts (e.g., executable scripts having executable code). The program module 142 is configured to find the artifact (computer script) with the hidden error, i.e., as the unique message 414, and the program module 142 corrects the artifact (computer script) which can include quarantining the artifact, preventing the artifact from executing, etc., thereby improving the functioning of the computer system 112 itself.

The program module 142 can send the unique message 414 to the user devices of the users, to the devices 302A-30N, and to other servers, and the program module 142 can translate the unique message 414 into an executable file to execute and display on the respective devices/servers.

Principal component analysis (PCA) is a statistical procedure that uses an orthogonal transformation to convert a set of observations of possibly correlated variables (entities each of which takes on various numerical values) into a set of values of linearly uncorrelated variables called principal components. If there are n observations with p variables, then the number of distinct principal components is min(n−1, p). This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors (each being a linear combination of the variables and containing n observations) are an uncorrelated orthogonal basis set.

Figure 5A:
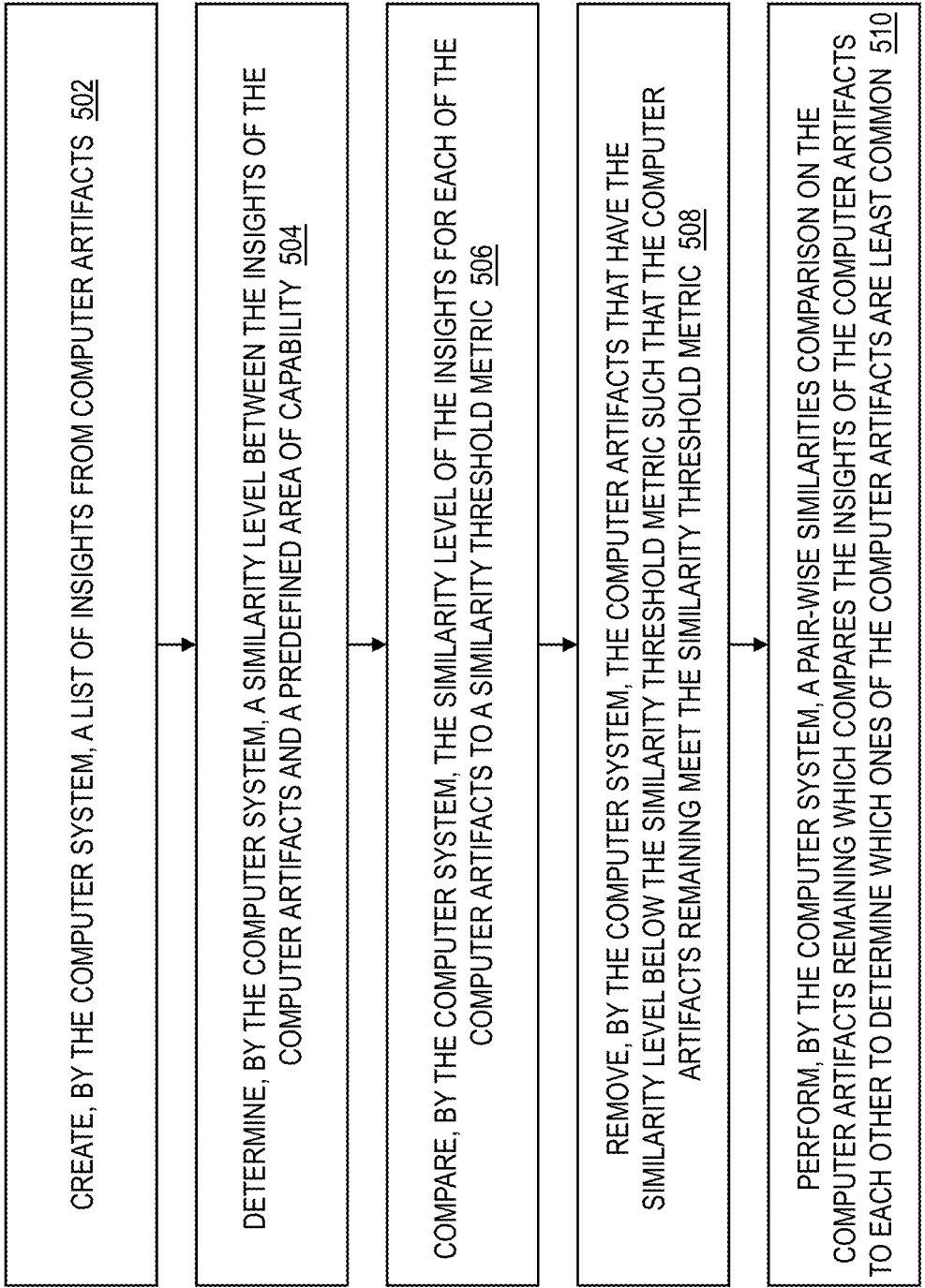
FIG. 5A depicts a flowchart of a computer-implemented method for computer artifacts in a computer system according to embodiments of the invention.

FIG. 5A depicts a flowchart 500 of a computer-implemented method for computer artifacts in a computer system 112 according to embodiments of the invention. FIG. 5B depicts a continuation of the flowchart 500 in FIG. 5A. The computer-implemented method can be executed by computer-executable instructions in one or more software applications (e.g., via program modules 142) of the computer system 112.

At block 502, the computer system 112 is configured to create a list of insights 306 from computer artifacts. The computer artifacts can be stored in one or more databases 304. At block 504, the computer system 112 is configured to determine a similarity level between the insights of the computer artifacts and a predefined area of capability.

At block 506, the computer system 112 is configured to compare the similarity level of the insights for each of the computer artifacts to a similarity threshold metric to determine if the similarity threshold metric is met. For example, each insight (e.g., topic) has its own similarity level (e.g., similarity percentage) that is compared to the similarity threshold metric to determine if the respective similarity level meets or exceeds the similarity threshold metric. Each insight (and corresponding similarity level) can be for an individual computer artifact and/or for a group of computer artifacts.

At block 508, the computer system 112 is configured to remove the computer artifacts that have the similarity level below the threshold metric such that the computer artifacts remaining meet (and/or exceed) the similarity threshold metric. The computer artifacts are data, for example, stored in the memory 128, and the computer artifacts that fail to meet the similarity threshold metric are deleted.

At block 510, the computer system 112 is configured to perform a pair-wise similarity comparison on the computer artifacts remaining (i.e., the non-deleted computer artifacts) which compares the insights of the computer artifacts to each other to determine which ones of the computer artifacts are least common. For example, the computer system 112 is configured to compare the topics of the computer artifacts to one another (in some cases a group of computer artifacts can be grouped under a single topic, such that one topic group for a group of computer artifacts is compared to another topic group for another group of computer artifacts). There can be least common artifacts and/or least common groups of artifacts, as depicted in FIG. 4.

At block 512, the computer system 112 is configured to create feature vectors 410 from the (text/words of the) computer artifacts that are least common.

At block 514, the computer system 112 is configured to determine a feature vector 412 having a most variation among the feature vectors 410, where the computer artifact associated with the feature vector having the most variation is determined to include a unique insight.

At block 516, the computer system 112 is configured to generate a unique message 414 using the computer artifact associated with the feature vector being the unique insight, the unique message 414 being related to the predefined area of capability.

Additionally, determining the similarity level between the insights of the computer artifacts and the predefined area of capability includes determining a level of semantic matches between the predefined area of capability (e.g., a product, service, and/or (potentially erroneous) computer script) and each respective one of the insights. The similarity threshold metric is a predefined amount, such as a percentage (70%).

Creating the list of insights from the computer artifacts includes inserting the insights associated with the computer artifacts into different groups (e.g., depicted in list of topic groups 306) based on determining related insights. Comparing the similarity level (percentage %) of the insights for each of the computer artifacts to the similarity threshold metric (percentage %) includes grouping the insights of the computer artifacts and comparing an insight group to the similarity threshold metric (e.g., depicted in blocks 204, 206).

The predefined area of capability defines a main topic (e.g., a product, service, and/or (potentially erroneous) computer script). Each of the insights defines a topic. The unique message 414 defines an aspect of the predefined area of capability, the aspect being previously unknown. For example, the predefined area of capability can be related to a malicious or potentially malicious executable scripts having executable code. The unique message 414 defines a unique aspect in a computer database 304. The unique message uncovers a unique aspect in memory 128, the unique message 414 defining a potential error in the memory 128.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for computer artifacts in a computer system, the method comprising:
   creating, by the computer system, a list of insights from the computer artifacts;
   determining, by the computer system, similarity levels between the insights of the computer artifacts and a predefined area of capability;
   comparing, by the computer system, each of the similarity levels of the insights of the computer artifacts to a similarity threshold metric;
   removing, by the computer system, the computer artifacts that have the similarity levels below the similarity threshold metric such that the computer artifacts remaining meet the similarity threshold metric;
   performing, by the computer system, a pair-wise similarity comparison on the computer artifacts remaining which compares the insights of the computer artifacts remaining to each other to determine which computer artifacts of the computer artifacts remaining are least common;
   creating, by the computer system, feature vectors for the computer artifacts that are least common;
   determining, by the computer system, a feature vector having a most variation among the feature vectors, where a computer artifact being least common associated with the feature vector having the most variation is determined to comprise a unique insight, the feature vector having the most variation being determined to be the most different among the feature vectors; and
   generating, by the computer system, a unique message using the computer artifact being least common associated with the feature vector having the most variation as the unique insight, the unique message being related to the predefined area of capability.

2. The method of claim 1, wherein determining the similarity levels between the insights of the computer artifacts and the predefined area of capability comprises determining a level of semantic matches between the predefined area of capability and each respective one of the insights.

3. The method of claim 1, wherein the similarity threshold metric is a predefined amount.

4. The method of claim 1, wherein creating the list of insights from the computer artifacts comprises inserting the insights associated with the computer artifacts into different groups based on determining related insights.

5. The method of claim 1, wherein comparing the similarity levels of the insights of the computer artifacts to the similarity threshold metric comprises grouping the insights of the computer artifacts and comparing an insight group to the similarity threshold metric.

6. The method of claim 1, wherein the predefined area of capability defines a main topic.

7. The method of claim 1, wherein each of the insights defines a topic.

8. The method of claim 1, wherein the unique message defines an aspect of the predefined area of capability, the aspect being previously unknown.

9. The method of claim 1, wherein the unique message defines a unique aspect in a computer database.

10. The method of claim 1, wherein the unique message uncovers a unique aspect in memory, the unique message defining a potential error in the memory.

11. A system for computer artifacts, the system comprising:
    a processor; and
    memory coupled to the processor and comprising computer-executable instructions that, when executed by the processor, cause the processor to perform a method comprising:
    creating, by the computer system, a list of insights from the computer artifacts;
    determining, by the computer system, similarity levels between the insights of the computer artifacts and a predefined area of capability;
    comparing, by the computer system, each of the similarity levels of the insights of the computer artifacts to a similarity threshold metric;
    removing, by the computer system, the computer artifacts that have the similarity levels below the similarity threshold metric such that the computer artifacts remaining meet the similarity threshold metric;
    performing, by the computer system, a pair-wise similarity comparison on the computer artifacts remaining which compares the insights of the computer artifacts remaining to each other to determine which computer artifacts of the computer artifacts remaining are least common;
    creating, by the computer system, feature vectors for the computer artifacts that are least common;
    determining, by the computer system, a feature vector having a most variation among the feature vectors, where a computer artifact being least common associated with the feature vector having the most variation is determined to comprise a unique insight, the feature vector having the most variation being determined to be the most different among the feature vectors; and
    generating, by the computer system, a unique message using the computer artifact being least common associated with the feature vector having the most variation as the unique insight, the unique message being related to the predefined area of capability.

12. The system of claim 11, wherein determining the similarity levels between the insights of the computer artifacts and the predefined area of capability comprises determining a level of semantic matches between the predefined area of capability and each respective one of the insights.

13. The system of claim 11, wherein the similarity threshold metric is a predefined amount.

14. The system of claim 11, wherein creating the list of insights from the computer artifacts comprises inserting the insights associated with the computer artifacts into different groups based on determining related insights.

15. The system of claim 11, wherein comparing the similarity levels of the insights of the computer artifacts to the similarity threshold metric comprises grouping the insights of the computer artifacts and comparing an insight group to the similarity threshold metric.

16. The system of claim 11, wherein the predefined area of capability defines a main topic.

17. The system of claim 11, wherein each of the insights defines a topic.

18. The system of claim 11, wherein the unique message defines an aspect of the predefined area of capability, the aspect being previously unknown.

19. The system of claim 11, wherein the unique message defines a unique aspect in a computer database.

20. A computer program product for computer artifacts, the computer program product comprising a computer readable storage medium having program instructions embodied therewith, wherein the computer readable storage medium is not a transitory signal per se, the program instructions executable by a computer system to cause the computer system to perform a method comprising:

creating, by the computer system, a list of insights from the computer artifacts;

determining, by the computer system, similarity levels between the insights of the computer artifacts and a predefined area of capability;

comparing, by the computer system, each of the similarity levels of the insights of the computer artifacts to a similarity threshold metric;

removing, by the computer system, the computer artifacts that have the similarity levels below the similarity threshold metric such that the computer artifacts remaining meet the similarity threshold metric;

performing, by the computer system, a pair-wise similarity comparison on the computer artifacts remaining which compares the insights of the computer artifacts remaining to each other to determine which computer artifacts of the computer artifacts remaining are least common;

creating, by the computer system, feature vectors for the computer artifacts that are least common;

determining, by the computer system, a feature vector having a most variation among the feature vectors, where a computer artifact being least common associated with the feature vector having the most variation is determined to comprise a unique insight, the feature vector having the most variation being determined to be the most different among the feature vectors; and generating, by the computer system, a unique message using the computer artifact being least common associated with the feature vector having the most variation as the unique insight, the unique message being related to the predefined area of capability.

\* \* \* \* \*